United States Patent [19]
Dornseifer et al.

[11] 3,950,676
[45] Apr. 13, 1976

[54] TRANSMISSION LINE-COMMUNICATIONS EQUIPMENT COUPLING UNIT HAVING SHORT-CIRCUIT AND OVERVOLTAGE PROTECTION

[75] Inventors: Karl Friedrich Dornseifer; Hans-Joachim Kirch, both of Cologne; Friedrich Levacher, Brauweiler; Karl Heinz Nolting, Cologne, all of Germany

[73] Assignee: Felten & Guilleaume Carlswerk Aktiengesellschaft, Cologne, Germany

[22] Filed: Jan. 7, 1974

[21] Appl. No.: 431,561

[30] Foreign Application Priority Data
Jan. 11, 1973  Germany............................ 2201234

[52] U.S. Cl................ 317/14 R; 317/61.5; 317/50; 333/24 C
[51] Int. Cl.²...................... H02H 7/04; H02H 3/22
[58] Field of Search............ 317/14 R, 14 B, 15, 61, 317/50, 61.5; 307/91, 92, 93; 336/70; 333/24 R, 24 C, 70 R, 8, 32

[56] References Cited
UNITED STATES PATENTS

| | | |
|---|---|---|
| 2,066,935 | 1/1937 | Hodnette........................... 317/14 B |
| 2,172,640 | 9/1939 | Nelson ............................... 317/14 B |
| 2,703,852 | 3/1955 | Meador................................. 336/70 |
| 3,644,787 | 2/1972 | Hamilton ............................. 317/31 |
| 3,771,069 | 11/1973 | Levacher et al. .................. 333/24 C |

*Primary Examiner*—J. D. Miller
*Assistant Examiner*—Patrick R. Salce
*Attorney, Agent, or Firm*—Michael J. Striker

[57] ABSTRACT

A transmission line carries power cables and twin wire communication lines. The coupling unit consists of an elongated, oil filled insulating body having metal caps closing off its opposite ends. The twin wires are brought to the low impedance terminals of an autotransformer which also has a pair of high impedance terminals and a center tap. Each of the high impedance terminals is coupled through a coupling capacitor to the high impedance terminals of a second autotransformer mounted within the second metal cap. The second autotransformer also has a center tap and also has a pair of low impedance terminals for connection to the communications equipment. The center tap of the first autotransformer is connected through a capacitor or a cathode drop arrester to the first metal cap. Overvoltage arresters are connected from the center tap to the low impedance and to the high impedance terminals of both autotransformers.

9 Claims, 2 Drawing Figures

U.S. Patent  April 13, 1976  3,950,676
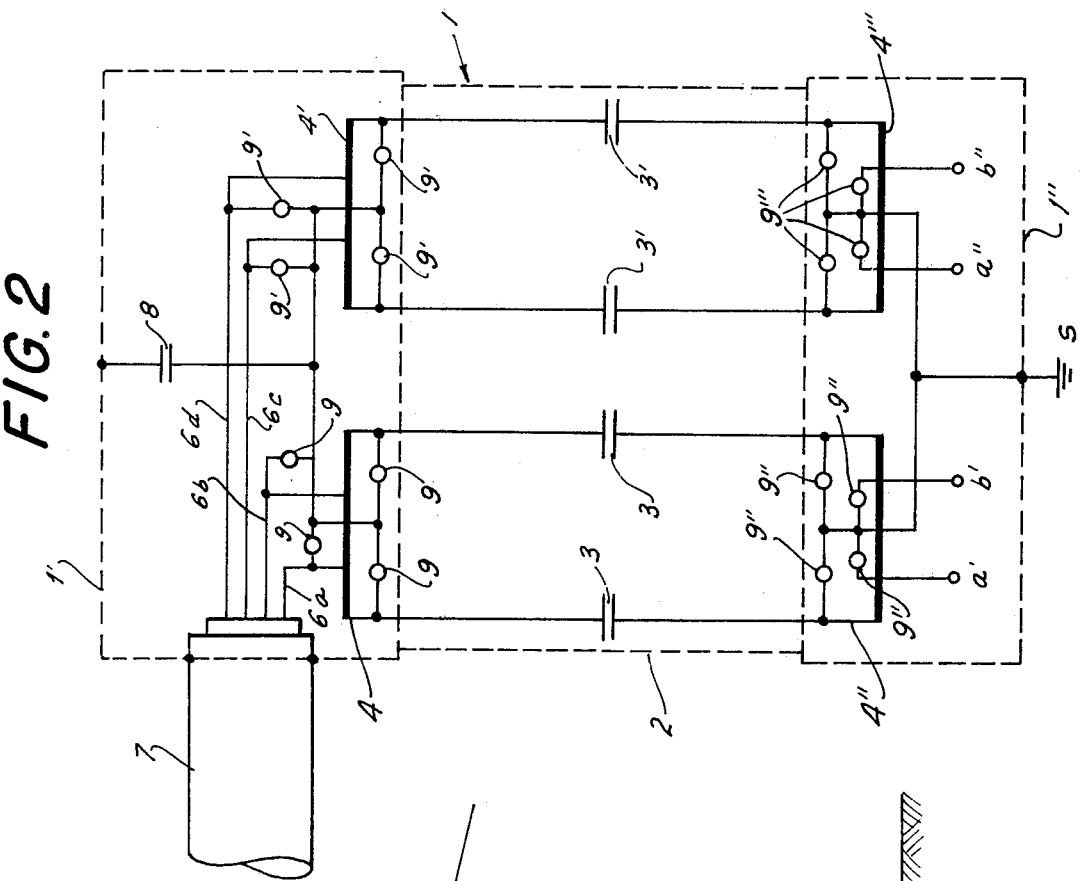
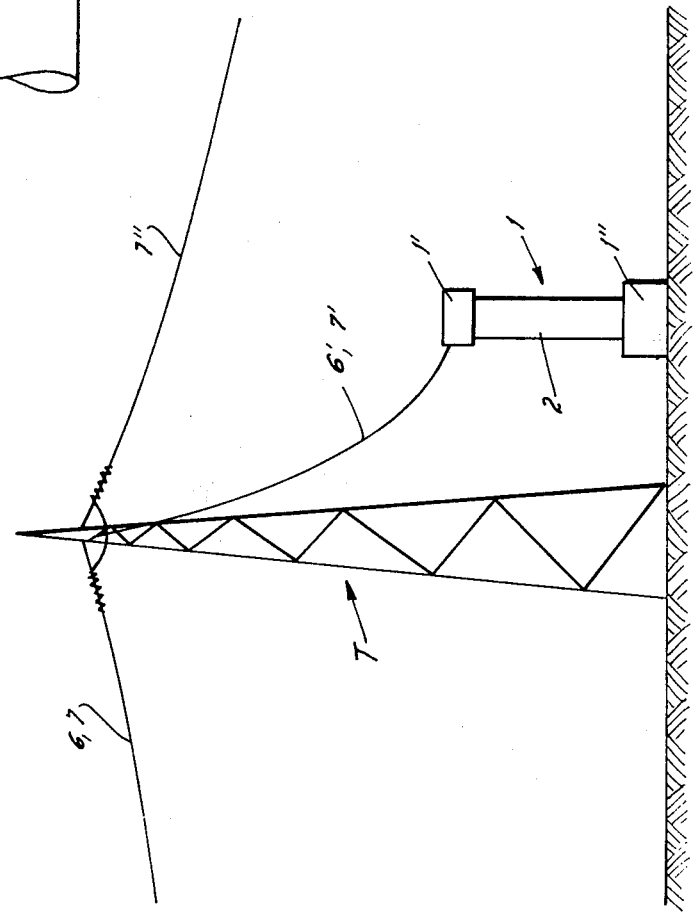

3,950,676

TRANSMISSION LINE-COMMUNICATIONS EQUIPMENT COUPLING UNIT HAVING SHORT-CIRCUIT AND OVERVOLTAGE PROTECTION

BACKGROUND OF THE INVENTION

The present invention relates to a coupling unit used to couple the communications wires in a transmission line which also carries power transmission lines to communications equipment whether it be receiver or transmitter.

The use of high voltage overhead or open lines for the transmission of communication signals in addition to power transmission is already known. In arrangements of this type the high voltage power cables are generally arranged to surround the communications wires so as to shield the latter from external stray fields. In this type of transmission, the transmission and reception of the communication signals (high frequency signals) must be carried out in a way which does not endanger the personnel which operates and services the communications equipment. Thus protection must be offered for high voltages which may appear on the communications wires due to voltage breakdown, corona or short-circuits, from the high-voltage power lines.

Coupling units for coupling the communications wire to communications equipment for the type of transmission described above are known, in which an insulating body filled with oil has two opposite ends, each covered by a metal cap. Within each metal cap is an autotransformer having a pair of low impedance terminals, a pair of high impedance terminals and a center tap. A first and second coupling capacitor connect corresponding high impedance terminals of the two autotransformers. The pair of low impedance terminals of the autotransformer mounted within the first metal cap is connected to the twin wires carrying the communication signals in the transmission line. The corresponding pair of terminals in the second autotransformer is connected to the communications equipment. The first autotransformer is thus used to effect an impedance match between the transmission cables and the coupling capacitors, while the second autotransformer is used to effect an impedance match between the impedance of the communications equipment and the coupling capacitors. In the known arrangement of this type, the metal cap surrounding the first autotransformer is connected to the power transmission line, while the center tap of the first autotransformer is connected to the first metal cap. Similarly, the center tap of the second autotransformer is connected to the second metal cap, but the second metal cap is grounded.

This known arrangement including the DC coupling between the high impedance terminals of the first autotransformer and the power lines cause all high voltages which may occur during operation to be taken up by the coupling capacitors and thus cause the servicing and operating personnel of the communications equipment to be protected therefrom.

However, this DC connection at the high voltage side between the communications line and the power line may have the following disadvantage. It effectively causes the high-current power line (armour) and the communications wires in the transmission cable between two coupling units to be connected in parallel. The communications wires thus take over a part of the power transmission and can easily be overloaded, particularly upon occurrence of a short-circuit between the armour of the transmission cable and ground or between adjacent phases of the polyphase power transmission system.

A further possibility for improvement of the known system is the protection of the windings of the autotransformers against overvoltages. Such overvoltages can occur due to transients in the power line, circuit conditions at the coupling units, or due to atmospheric disturbances, any of which factors may create excessively high voltage drops across the windings of the autotransformer.

SUMMARY OF THE INVENTION

It is an object of the present invention to furnish a coupling unit of improved type, which is capable of maintaining uninterupted communication in spite of either lightening or short-circuits in the power transmission line. It is a further object of the present invention to protect the communications equipment from current or voltage overloads due to the above causes.

The present invention resides in a transmission system having a transmission cable including first conductor means for transmitting power and at least one twin wire pair for transmitting carrier frequency communication signals. The transmission system further has a coupling unit for coupling communications equipment to said twin wires, the coupling unit comprising an elongated hollow insulating body having a first and second metal cap covering its opposite ends. A first and second autotransformer are respectively mounted in said first and second metal caps. Each of the autotransformers have a pair of high impedance terminals, a pair of low impedance terminals and a center tap. The first metal cap is DC coupled to the power line, and the center tap of the first autotransformer is connected to said first metal cap. The second metal cap is connected to ground potential, the center tap of the second autotransformer also being connected to ground. A coupling capacitor is connected between each high impedance terminal of one autotransformer and the corresponding high impedance terminal of the second autotransformer. Each of the low terminals of the first autotransformer is connected to one of the twin wires, while each of the low impedance terminals of the second autotransformer is connected to the communications equipment. In accordance with the present invention, a current limiting circuit element is connected from the center tap of the first autotransformer to the first metal cap. Further, high voltage arresters are connected from the center tap of the first autotransformer to at least one high impedance terminal. In a preferred embodiment of the present invention high voltage arresters are connected between the center tap of the first autotransformer and each of the high and low impedance terminals. Similarly, high voltage arresters are connected between the center tap of the second autotransformer and each of the low and high impedance terminals of said second autotransformer.

The current limiting circuit element connected between the center tap of the first autotransformer and the metal cap which is connected to the power lines allows currents which might otherwise overload the communications wires to be suppressed, both under normal operation and in case of short-circuits. The overvoltage arresters of course cause voltage peaks such as may result from lightening striking the cable to be limited to acceptable values. The use of these overvoltage arresters of course does not affect the operation of the equipment during normal operating conditions.

A preferred embodiment of the present invention the current limiting circuit element is a capacitor. This capacitor will carry relatively little current since it has a relatively high impedance at the 60 cycle per second power frequency. However, high voltages with a steep leading edges cause a high current to flow over the coupling capacitor-protective capacitor series combination, causing the charges to be rapidly conducted to ground.

In a further preferred embodiment of the present invention the capacity of the protective capacitor connected between the center tap of the first autotransformer and the first metal cap is approximately 50 times as large as the capacitance of one of the coupling capacitors. This results from the fact that under normal operation, the current carried by the protective capacitor should be small, therefore requiring a small capacitance. However, during lightening, a particularly small impedance and thus a high capacitance for the protective capacitor is desirable. The factor 50 is a compromise resulting from these two considerations.

In a further preferred embodiment of the present invention, each of the coupling capacitors has a capacitance of approximately 1000 pico farads. This causes relatively low losses to be introduced into the communication system in the normal carrier frequency band of 15 KHz to 500 KHz, while effectively isolating the communications equipment from high voltages.

Depending on the voltage in the power cables, it may be advantageous to use a cathode drop arrester having a resistance varying as a function of voltage applied thereto as current limiting circuit element instead of the capacitor. Under normal operating conditions the communication wires are then insulated from the power cables by the high resistance of the cathode drop arrester. In case of lightening received either by the cable or by the coupling unit, the cathode drop arrester ignites causing its resistance to become very low. The lightening is then conducted through the coupling capacitors to ground. Under these conditions the communications wire and the power line are connected in parallel while the cathode drop arrester has a low resistance. During this period the communications wires thus carry a portion of the discharge current, which substantially exceeds the 60 cycle current which under normal operating conditions is isolated from the communications cable by the cable capacitance and the coupling capacitance.

In a preferred embodiment of the present invention, the extinction voltage of the cathode drop arrester exceeds half the line-to-line voltage of the power line. Thus if a short-circuit to ground occurs following a lightening stroke, the cathode drop arrester again becomes a high resistance. The communications wires then do not take up any of the short-circuit current, which flows to ground without passing through the cathode drop arrester.

In a further preferred embodiment of the present invention, two sets of twin wires are present. A first and second autotransformer is provided for each set of twin wires. The center taps of all first autotransformers are directly connected. The current limiting circuit element is then a single current limiting circuit element connected between the common connection of all center taps and the first metal cap. Thus the added protection afforded by the present invention is not associated with greatly increased extra cost.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side elevation, in schematic form, showing an overhead or open line carrying tower and the coupling unit of the present invention; and FIG. 2 is a schematic diagram of the improved coupling unit of the present invention.

DESCRIPTION OF THE PREFERRED
EMBODIMENTS

A preferred embodiment of the present invention will now be described with reference to the drawing.

In FIG. 1, a tower T is shown which carries a cable including power lines 6 and communication wires 7. At the top of the tower T, the transmission cable 6, 7 branches off into cables 6', 7' which are brought down to the coupling unit 1 which is the subject of the present invention and which couples the communication wires to communications equipment. Further, the high voltage power lines, 7'' continue on to the next power and/or receiving or transmitting station. Line 6', 7' are schematically indicated to terminate at a metal cap 1' which will be discussed in more detail in connection with FIG. 2, while a second metal cap 1'' is shown at ground potential. An elongated hollow insulating body extending between the metal caps has reference numeral 2.

The coupling unit, generally designated by reference numeral 1 in FIG. 1, will now be discussed in greater detail with reference to FIG. 2. In FIG. 2, the communications signals, herein also referred to as carrier frequency signals are carried by two pairs of twin wires, shown as four wires labelled 6 in the Figure, which are the sets of twin wires carrying the high frequency signals. They are electrically insulated in the cable from the high voltage power lines 7. The coupling unit 1 of the present invention may be used either to apply the communication signals to line 6 in which case terminals $a'$, $b'$ and $a''$, $b''$ are connected to communications transmitting equipment or, may be used to couple signals furnished on line 6 to receiver equipment in which case terminals $a'$, $b'$, $a''$ and $b''$ (which will be described in more detail below), are connected to receiver equipment. Coupling unit 1 comprises an insulating body 2 which on its opposite ends has metal caps 1' and 1'', herein referred to as a first and second metal cap respectively. The first twin wire having conductors 6a and 6b is connected to the low impedance terminals of an autotransformer 4 whose high impedance terminals are connected through coupling capacitors 3 to the high impedance terminals of a second autotransformer 4''. Similarly, twin conductors 6c and 6d are connected to the low impedance terminals of an autotransformer 4' whose high impedance terminals are connected to the high impedance terminals of a further autotransformer 4''' through coupling capacitors 3'. The center tap of autotransformer 4 is connected to the center taps of autotransformer 4' by a direct line. The so-connected center taps are connected through a capacitor 8 to metal cap 1'. Further, high voltage arresters 9 are connected from the center tap to the individual high and low impedance terminals of autotransformer 4. Similarly the center tap of autotransformer 4' is connected through high voltage arresters 9' to each of the high and low impedance terminals. High voltage arresters 9'' are similarly connected to the various terminals of autotransformer 4'', while high voltage arresters 9''' are connected from the center tap of autotransformer 4''' to each of its high and low impedance terminals.

In a preferred embodiment of the present invention, autoransformers 4 and 4' match the characteristic impedance of the communication line of approximately 150 ohms to an impedance of 5000 ohms. Coupling capacitors 3 and 3' are selected to be approximately 1000 pF. With these values, the combination of the matching transformers and coupling capacitors provide a frequency band pass which can pass frequencies from approximately 20 KHz to approximately 500 KHz. Frequencies outside of this range will be greatly attenuated. Further, capacitors 3 must have a high voltage rating to prevent breakdown under high voltage transient conditions. In a preferred embodiment of the present invention the elongated hollow insulating body 2, which is oil filled, is about 2 meters in length. Metal caps 1' and 1'' close off the ends and also serve to shield the autotransformers from outside interference. As shown in the Figures, the power line is a single phase line which may be 110 killovolts. Alternatively, a three-phase line may be in use, requiring the use of three coupling units as shown in FIG. 2, one for each phase. Transformers 4'' and 4''' offer a low impedance to the power line frequency while, as stated above, matching the impedance of the coupling capacitors at the communications frequencies.

Capacitor 8 causes the communications lines to be isolated from the power lines except at very high frequencies. Overvoltages on any of the communications lines are shunted to ground through the respective high voltage arresters.

As an alternative to capacitor 8 shown in the drawing, a cathode drop arrester may be used. As stated above this cathode drop arrester has a high resistance under normal operating conditions, but switches to a low resistance when a high voltage is present across it. Thus lightening would cause it to assume a low resistance and provide a path through the coupling capacitors to ground. The extinction potential of the cathode drop arrester is chosen to exceed half the line-to-line voltage of the power system.

Overvoltages existing on the communications lines are of course shunted to ground potential by use of arresters 9, 9', 9'' and 9'''.

It is seen that the improvements of the present invention provide economical means for increasing the reliability and the efficiency of operation of the coupling unit.

While the invention has been illustrated and described as embodied in using either a capacitor or a cathode drop arrester as the means for isolating the communications lines from the power lines, it is not intended to be limited to the details shown, since various structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a transmission system having a transmission cable for transmitting power on first conductor means in said cable and for transmitting carrier frequency communication signals on at least one set of twin wires electrically isolated from said first conductor means, said transmission system further having a coupling unit for coupling said carrier frequency communication signal to receiver equipment, said coupling unit comprising an elongated hollow insulating body having opposite ends, a first and second metal cap for closing said opposite ends, first autotransformer means mounted within said first metal cap and having a pair of low impedance terminals connected to said pair of twin conductors, a pair of high impedance terminals, and a center tap, first and second coupling capacitor means having first terminal connected to said high impedance terminals of said autotransformer means and a second terminal, and second autotransformer means mounted within said second metal cap and having a pair of high impedance terminals connected to said second terminals of said first and second coupling capacitor means, a pair of low impedance terminals adapted for connection to said receiver equipment and a center tap, in combination, means for limiting current flow comprising a protective capacitor connected between said center tap of said first autotransformer means and said first conductor means; and at least one overvoltage connected from said center tap of said autotransformer means to one of said high impedance terminals.

2. A transmission system as set forth in claim 1, further comprising additional overvoltage arresters connected from the remaining one of said high impedance terminals, and from said pair of low impedance terminals to said center tap of said autotransformer means.

3. A transmission system as set forth in claim 1, further comprising receiving end overvoltage arresters connected from said high impedance terminals of said second autotransformer means to said center tap of said second autotransformer means.

4. A transmission system as set forth in claim 3, further comprising additional receiver and overvoltage arresters connected between said low impedance terminals and said center tap of said second autotransformer means.

5. A transmission system as set forth in claim 1, wherein said protective capacitor has a capacitance approximately 50 times as great as the capacitance of one of said first and second coupling capacitors.

6. A transmission system as set forth in claim 5, wherein the capacitance of each of said coupling capacitors is approximately equal to 1000 pF.

7. A transmission system as set forth in claim 1, wherein said communications equipment is receiver equipment.

8. A transmission system as set forth in claim 1, wherein said communications equipment is transmitting equipment.

9. A transmission system as set forth in claim 1, wherein said transmission cable has a first and second twin wire; wherein said first autotransformer means comprise a first and second autotransformer each having a pair of low impedance terminals connected to one of said twin wires, each of said first autotransformers further having a center tap; further comprising means for directly connecting said center tap of said autotransformer; and wherein said means for limiting current flow is connected from the so-connected center taps to said first metal cap.

* * * * *